Nov. 5, 1963  J. RIEMER  3,109,638
ADJUSTING MECHANISM FOR A SPRING STRUT OF A MOTOR VEHICLE
Filed May 18, 1959
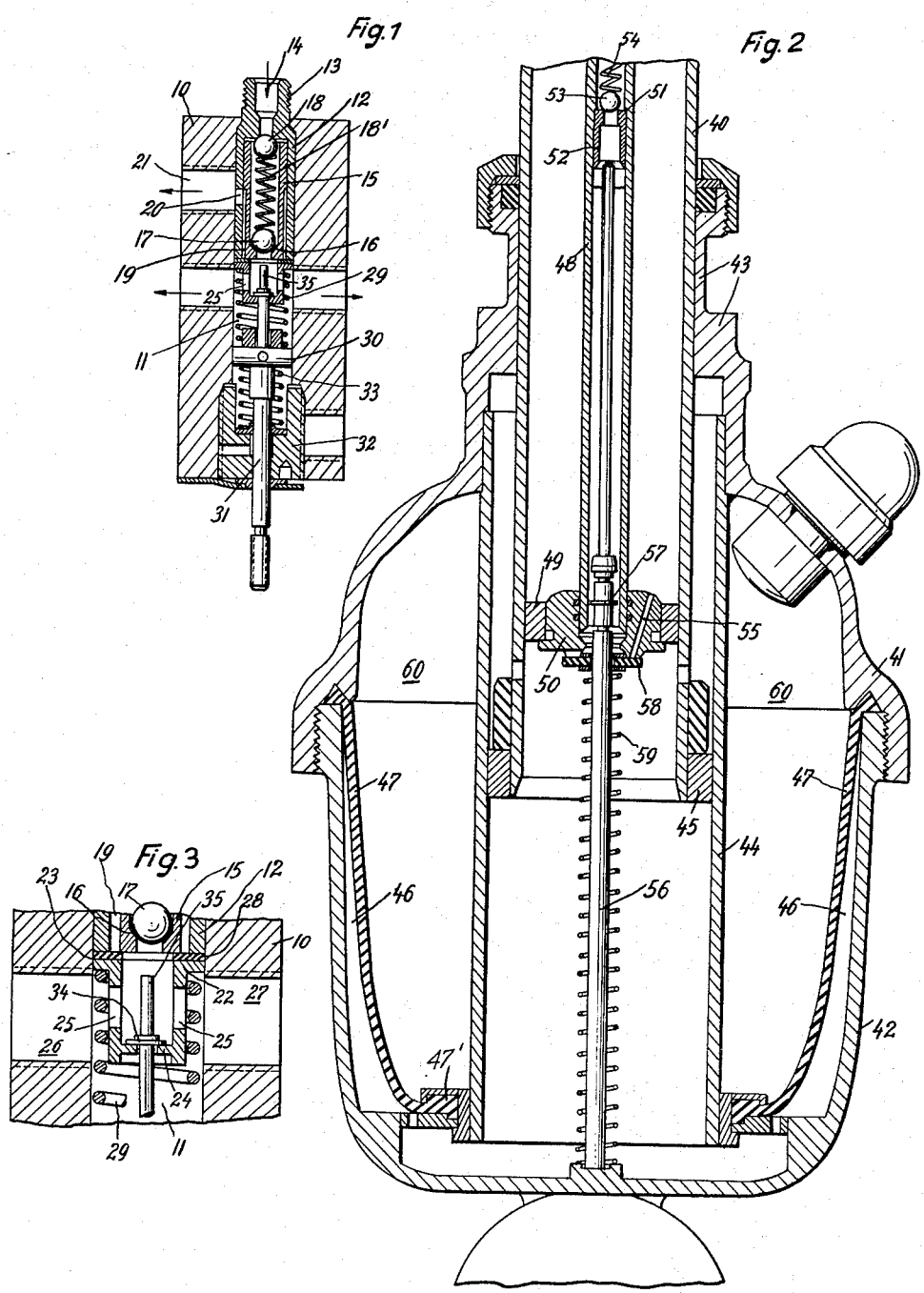
Inventor
JOSEF RIEMER
BY Dicke, Craig and Freudenberg
ATTORNEYS

3,109,638
ADJUSTING MECHANISM FOR A SPRING STRUT OF A MOTOR VEHICLE
Josef Riemer, Post Bretzenacker uber Backnang, Germany, assignor to Daimler-Benz Aktiengesellschaft, Stutigart-Unterturkheim, Germany
Filed May 18, 1959, Ser. No. 814,085
Claims priority, application Germany May 21, 1958
1 Claim. (Cl. 267—64)

My invention relates to a mechanism for automatically adjusting the length of a spring strut in a motor vehicle, the spring strut being of the type comprising a pair of relatively movable sections forming a chamber of variable volume being filled partly by a liquid and partly by a compressed gaseous medium.

It is the object of my invention to provide an automatic adjusting mechanism of this kind in which the admission duct and the outlet duct extend from the respective valve seats in substantially the same direction, thus greatly facilitating the accommodation of the ducts, particularly in that section of the spring strut which is mounted on the chassis or body of the vehicle as distinguished from the other section which participates in the up and down movements of the wheel axle.

Further objects of my invention will appear from a detailed description of two preferred embodiments of my invention following hereinafter with reference to the accompanying drawing and the features of novelty will be pointed out in the appended claim. I wish it to be understood, however, that my invention is in no way limited to the details of such embodiments but is capable of numerous modifications within the scope of the appended claim and that the terms and phrases used in the description have been chosen for the purpose of explaining the invention rather than that of restricting or limiting the same.

In the accompanying drawings,

FIG. 1 is an axial section of an automatic adjusting mechanism mounted on the body of the vehicle for connection by suitable pipes with the spring struts not shown, FIG. 2 is a partial elevation of a spring strut, partly shown in section, said strut being equipped with my novel automatic adjusting mechanism, and FIG. 3 illustrates the central portion of FIG. 1 on an enlarged scale.

The mechanism shown in FIG. 1 has a housing 10 mounted on the body or the chassis of a motor vehicle for connection by suitable pipes not shown with a pair of spring struts coordinated to opposite wheels of the motor vehicle, each of the two spring struts comprising a pair of relatively movable sections cooperating to form a chamber of variable volume, such chamber being filled partly by a liquid and partly by a compressed gaseous medium. The housing 10 is provided with a longitudinal bore 11 having an internal shoulder near its upper end and joining an internally threaded counterbore of larger diameter at its lower end. A sleeve 12 having an upper end of reduced outer diameter is inserted in the bore 12 so that its upper end section 13 projects therefrom, such section being provided with external threads for connection to a pipe leading to a source of liquid under pressure, such as a suitable pump. The internal space of the sleeve 12 communicates with a bore 14 of the end section 13, such bore having a smaller diameter than the internal space of the sleeve 12. Inserted within this space there is a bushing 15 having near its lower end an upwardly facing internal shoulder 16 forming a valve seat for cooperation with a spherical valve element 17. A second spherical valve element 18 disposed in the upper end of the bushing 15 has a larger diameter than the reduced lower end of the bore 14 for cooperation therewith. A helical pressure spring 18′ is inserted in the bushing 15 between the two valve elements 17 and 18. A peripheral annular clearance 19 is provided between the sleeve 12 and the bushing 15 extending from their lower ends into registry with a radial bore 20 provided in the sleeve 15 for communication with a radial port 21 provided in the housing 10 and formed with internal threads for the connection therewith of a pipe line leading to the sump of the pump referred to hereinabove. The lower end faces of the sleeve 12 and of the bushing 15 are located in a common transverse plane extending at right angles to the axis of the bore 11 and cooperate to constitute a valve seat for cooperation with a tubular valve element 22 having an external peripheral flange at its upper end for guidance within the bore 11 of the housing 10 and an internal collar 24 near its lower end and provided with a pair of diametrical apertures 25 registering with diametrically opposite bores 26 and 27 provided in the housing 10. The plane upper end face of the tubular valve element 22 and, more particularly, of the flange 23 thereof is provided with a suitable lining 28 of rubber or a rubberlike plastic. The internal diameter of the valve element 22 is smaller than the external diameter of the lower end of the bushing 15. As a result, the valve element 22 will close the clearance 19 when assuming the position illustrated in FIG. 3 under the pressure exerted by a helical spring 29 which surrounds the tubular member 22 and is compressed between the bottom side of the flange 23 and a collar 30 of a stem member 31 which is coaxially disposed with respect to the bore 11 of the housing 10 and extends into the lower end of such bore. The stem member 31 is slidably guided within an axial bore of a plug 32 which engages the internal threads of the large counter-bore provided in the bottom end of housing 10. Another helical spring 33 surrounds the stem member 31 between the collar 30 and the bottom of a recess provided in the top of the plug 32. The upper section of the stem element 31 above the collar 30 is provided with a second collar 34 located above the collar 24 of the valve element 22 and spaced from both the upper end 35 of the stem 31 and from the collar 30 thereof.

The diametrically opposite bores 26 and 27 of the housing 10 are provided with internal threads for connection by suitable pipes with the variable chambers of the spring struts coordinated to opposite wheels of the vehicle. The lower end of the stem member 31 that projects out of the plug 32 is mounted for movement by the same springing motion of the vehicle that acts on the lower sections of the spring struts. More particularly, the lower end of the stem 31 is connected by suitable means with one of the wheel axles sprung by the spring struts.

The operation of the mechanism described hereinabove is as follows:

Normally, when the spring struts have a length holding the chassis or body of the car at a height resulting in the desired ground clearance, the stem member 31 connected to one of the wheel axles will assume such a position relative to the housing 10 connected to the body or the chassis of the vehicle that the upper end 35 of the stem member is below the spherical valve element 17 and the collar 34 of the stem element is located above the collar 24 without exerting pressure thereon. As a result, the spring 29 will keep the clearance 19 closed and the helical spring 18′ will keep the two spherical valve elements 17 and 18 in closed condition. Now let it be assumed that a heavy load is imposed on the vehicle which will shorten the spring struts and increase the compression of the gaseous medium in the chambers thereof, thus reducing the road clearance and causing consequent upward displacement of the stem member 31 relative to the housing 10 fixed to the body or the chassis of the vehicle. As a result, the upper end 35 of the stem element will engage the spherical valve element 17 and will lift it from its seat 16 contrary to the pressure exerted by the spring 18' and contrary to the pressure exerted by the liquid supplied by the pump through bore 14. As a result, liquid under pressure supplied by the pump to the bore 14 will flow past the check valve formed by the spherical valve element 18 and will pass downwardly through the bushing 15 past the spherical valve element 17 and the valve seat 16 downwardly through the tubular valve element 22 through the apertures 25 and the bores 26 and 27 into the chambers of the spring struts, thereby extending such spring struts. Hence, the spring struts will lift the body or chassis of the vehicle until the consequent upward displacement of the housing 10 relative to the stem element 31 will lift the valve seat 16 so far above the upper end 35 of the stem member that the spherical valve element 17 will re-engage its seat 16 and thus discontinue the further feed of liquid under pressure into the spring struts.

When the vehicle is relieved from the load causing the compressed gaseous medium within the spring struts to expand and to lift the chassis or body of the vehicle, the housing 10 connected thereto will be moved upwardly relative to the stem member 31 until the collar 34 of the stem member will engage the internal collar 24 of the valve element 22, thus preventing the tubular valve element 22 from participating in the further upward displacement of the housing 10 and the sleeve 12 and the bushing 15 fixed thereto. As a result, the bushing 15 and the sleeve 12 will be disengaged from the valve element 22, thus establishing communication between the clearance 19 and the bore 11 permitting the liquid in the chambers of the spring struts to escape through the pipes (not shown), through the bores 26 and 27, through the apertures 25, upwardly through the tubular valve element 22, further through the clearance 19 and the aperture 20, the port 21 and the return pipe (not shown) connected thereto. This escape of liquid from the spring struts will permit the struts to shorten under the weight of the body of the vehicle until the consequent downward movement of the housing 10, the sleeve 12 and the bushing 15 will re-engage the latter with the valve element 22 restoring the elements to the relative position illustrated in FIG. 3.

If desired, a lost motion connection may be provided between the stem member 31 and the wheel axle connected therewith.

The embodiment illustrated in FIG. 2 differs from that described hereinabove by the mounting of my novel adjusting mechanism within a spring strut.

The spring strut illustrated in FIG. 2 comprises an upper tubular section 40 suitably connected with the body or chassis of the vehicle and telescoped in a lower section suitably connected to a wheel axle, such lower section comprising a composite housing 41, 42 having an upper neck portion 43 slidably guided on the tubular section 40 and an internal tubular cylinder 44 inserted in and welded to the neck portion 43 and surrounding the tubular section 40 in spaced coaxial relationship, the lower end of the tubular section being provided with an annular member 45 sealingly engaging the internal face of the cylinder 44 and acting as a piston therein. The internal space of the cylinder 44 below the internal member 45 communicates with an annular space 46 confined by the lower section 42 of the housing and a substantially conical flexible diaphragm 47 having its upper edge clamped between the sections 41 and 42 of the housing and having its lower end 47' secured to the lower end of the cylinder 44 which is spaced from the bottom of the housing 42. A tubular member 48 is mounted coaxially within the tubular member 40 being held therein by a pair of nested rings 49 and 50 and by suitable other means not shown. The tubular member 48 is provided with an internal downwardly facing shoulder 51 on which the upper end of a sleeve 52 is seated which constitutes an upwardly facing valve seat cooperating with a spherical valve element 53 subjected to the pressure of a helical spring 54. The upper end of the tubular member 48 is connected with a suitable source of liquid under pressure, for instance with a pump. The lower end of the ring 50 is provided with a plurality of circumferentially distributed projections having their bottom faces located in a common plane extending perpendicularly to the axis of the ring 50. Each of these projections is provided with a bore 55 opening in the lower end face of the projection and leading to the annular space provided between the tubular members 40 and 48.

A stem member 56 disposed coaxially within the cylinder 44 has its lower end fixed to the bottom of the housing section 42 and extends upwardly into the lower end of the tubular member 40 and into the tubular member 48 to a point normally located below the spherical valve member 53. Moreover, the stem member 56 is provided with a collar 57 normally located within the lower end of the tubular member 48. An annular disk 58 is slidably guided on the stem member 56 below the ring 50 and is subjected to the upwardly directed pressure of a helical spring 59 which surrounds the stem member 56 and is braced upon the bottom of the housing section 42. The disk 58 represents a valve element which normally closes the bores 55.

The annular space 60 confined by the upper housing section 41, the diaphragm 47 and the cylinder 44 is filled with a compressed gaseous medium.

The operation of the spring strut shown in FIG. 2 is as follows:

When the load acting upon the spring strut is increased, the upper section 40 is displaced in downward direction within the housing 41, 42 and 43, thereby displacing part of the liquid contained in the lower end of the tubular element 40 beneath the rings 49 and 50 and within the lower end of the cylinder 44 and forcing such liquid into the space 46, thereby flexing the diaphragm 47 inwardly and increasing the compression of the gaseous medium in the chamber 60. When the downward displacement of the section 40 of the spring strut exceeds a certain limit, the spherical valve element 53 will engage the upper end of the stem element 56 and will be lifted thereby from its seat, thus permitting the liquid under pressure supplied to the upper end of the tubular member 48 to pass downwardly through the tubular member 48 and to flow in outward direction between the lower projections of the ring 50 and above the disk 58 into the chamber 46. This will have the effect of increasing the internal pressure of the spring strut, thus forcing the section 40 upwardly again to thereby raise the body or chassis of the vehicle until the valve element 53 will be lifted above the upper end of the stem member 56.

Inversely, an upward displacement of the strut section 40 caused by a relief of the body or chassis of the vehicle from a load will move the disk 58 into engagement with the collar 57 of the stem member causing the ring 50 to be lifted from the disk 58, thereby opening the discharge passages 55 which permit the liquid under pressure to escape from the chamber 46 into the annular space between the tubular members 40 and 48, such annular space being connected to a return pipe leading to the sump of the pump. The discharge of liquid will result in a shortening of the spring strut, whereby the valve element 58 will be closed again.

The up and down springing movement of the wheels during the travel of the vehicle will result in alternating brief periods of discharge of liquid and feed of liquid with the result that the average length of the spring struts will be kept within predetermined narrow limits independently of the load imposed on the vehicle.

It will be noted that in both of the embodiments described hereinabove the coaxial valve seats are formed by a body constituting a rigid member. In the embodiment illustrated in FIG. 1 such body is formed by the housing 10, the sleeve 12 and the bushing 15, whereas in the embodiment of FIG. 2 such body is formed by the tubular member 48, the sleeve 52 and the ring 50.

From the foregoing it will be seen that this invention is one well adapted to attain all of the ends and objects hereinabove set forth, together with other advantages which are obvious and which are inherent to the mechanism.

While the invention has been described in connection with two preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claim.

What I claim is:

In a length adjusting mechanism for a spring strut of a motor vehicle, the combination of a spring strut forming a chamber means of variable volume, said chamber means including an outer housing, a cylinder supported within and by said housing, a flexible diaphragm within said housing and forming with said cylinder a closed inner gas chamber and forming with said housing a closed outer liquid chamber, piston means within said cylinder movable relative to said housing, said piston means including a hollow member having an end thereof slidably arranged in said cylinder and closure means adjacent said end of said hollow member, inlet means for the admission of liquid into said cylinder including conduit means extending into said hollow member and an inlet valve in said conduit means, said inlet valve including a valve seat, a ball valve element positioned upstream of said seat and adapted to seat thereagainst, and spring means for normally maintaining said element in the closed position thereof, means connecting the interior of said cylinder and said outer liquid chamber, discharge means for discharging liquid from said cylinder including an annular chamber formed between said hollow member and said conduit means and defining an annular liquid discharge passage, and outlet valve means for controlling the discharge of liquid into said discharge passage, said outlet valve means including at least one passage extending through the closure means of said piston means, an essentially flat annular disk member adapted to seat against said closure means and close said passage, and spring means engaging said disk member for normally seating said disk member on said piston means, and a stem member relatively fixed with respect to said housing and being mounted for movement with said housing during motion of said spring strut for opening said inlet valve when moved in one direction relative to said piston means, said disk member being slidably supported on said stem member whereby when said stem moves to open the inlet valve said outlet valve means is afforded freedom to remain closed, said stem member including an abutment means thereon adapted to engage said disk member when said stem member is moved in the direction opposite to said one opening to move said disk member against the action of said spring means and thereby open said outlet valve means.

References Cited in the file of this patent

UNITED STATES PATENTS

| | | |
|---|---|---|
| 962,516 | Mueller | June 28, 1910 |
| 2,083,244 | Semans | June 8, 1937 |
| 2,620,182 | Marston | Dec. 2, 1952 |
| 2,915,307 | Heiss | Dec. 1, 1959 |
| 2,918,273 | Whisler et al. | Dec. 22, 1959 |
| 2,929,407 | Christensen | Mar. 22, 1960 |
| 2,976,032 | Sampietro | Mar. 21, 1961 |